United States Patent [19]

Lamartino et al.

[11] Patent Number: 4,766,645
[45] Date of Patent: Aug. 30, 1988

[54] SIZE CONTROL SYSTEM FOR STUFFING MACHINE

[75] Inventors: Salvatore P. Lamartino, Orland Park; Jack L. Stansbeary, Schaumburg; Charles R. Saville, Worth, all of Ill.

[73] Assignee: Viskase Corporation, Chicago, Ill.

[21] Appl. No.: 39,197

[22] Filed: Apr. 16, 1987

[51] Int. Cl.$^4$ .................................. A22C 11/02
[52] U.S. Cl. .................................. 17/49; 17/35
[58] Field of Search .................. 17/35, 49, 41, 42

[56] References Cited

U.S. PATENT DOCUMENTS

| | | | |
|---|---|---|---|
| 2,999,270 | 9/1961 | Knapp | 17/35 |
| 3,148,408 | 9/1964 | Good | 17/35 |
| 3,396,426 | 8/1968 | Ziolko | 17/35 |
| 3,553,768 | 1/1971 | Wilmsen | 17/35 |
| 4,077,090 | 3/1978 | Frey et al. | 17/41 |
| 4,558,488 | 12/1985 | Martinek | 17/41 |
| 4,625,362 | 12/1986 | Kollross et al. | 17/49 X |

OTHER PUBLICATIONS

T-Sizer, Dated: Mar. 3, 1986, pp. 1 thru 15.

*Primary Examiner*—Willie G. Abercrombie
*Attorney, Agent, or Firm*—Roger Aceto

[57] ABSTRACT

An apparatus for controlling the stuffed casing diameter includes shoes which ride against the stuffed casing to monitor its diameter. These shoes drive a digital encoder which issues pulses representing deviations of the stuffed diameter from a predetermined nominal value. A microcomputer process these pulses and issues an appropriate control signal to a stepping motor for increasing and decreasing drag on the casing as may be needed to correct the stuffed diameter of the casing. The microcomputer can include a delay so that each stuffed product is the reference for establishing the drag characteristics of the next product to be stuffed.

18 Claims, 5 Drawing Sheets

SIZE CONTROL SYSTEM FOR STUFFING MACHINE

TECHNICAL FIELD

The present invention relates to a method and apparatus for automatically controlling the filled diameter of casing during stuffing.

BACKGROUND OF THE INVENTION

For aesthetic, economic and quality control considerations it is desirable, for certain food products, to stuff the casing to a substantially uniform filled diameter over its entire length. For example, a substantially uniform filled diameter is especially desired for the production of stuffed products which are subsequently sliced and prepackaged for retail sales. Machines which slice these products usually are set up to cut a predetermined number of slices for each package, but at retail the packages are sold on a weight basis. Accordingly, it is important for the producer to stuff products of substantially uniform filled diameter so that the predetermined slice count will consistently produce packages of substantially the same weight.

Automatic stuffing machines use casing in the form of a shirred stick so that a plurality of stuffed products or "logs" can be made from a single stick. For example, a shirred stick two feet long may contain upwards of two hundred feet or more of casing. After the stick is loaded onto the machine, the intention is to run the machine continuously until the supply of casing is exhausted. Accordingly, it is important that the stuffed diameter of the logs made during the run remains substantially constant.

Stuffed diameter is determined by several factors such as the extensibility of the casing, its moisture content, the drag on the casing during filling and the stuffing pressure. In U.S. Pat. No. Re. 30,390, a stuffing machine is disclosed which includes means for continuously stuffing shirred casing to produce logs of substantially constant stuffed diameter. In this system, a sizing disc implanted in the casing serves to circumferentially stretch the casing just prior to stuffing. This circumferential stretch exerts a drag or "holdback" on the casing to insure that the casing stuffs out to the full diameter recommended by the casing manufacturer.

Due to casing manufacturing tolerances, the diameter of a casing may vary along its length. To some extent, the sizing disc as disclosed in U.S. Pat. No. Re. 30,390 compensates for this variation in casing diameter so the filled diameter is substantially constant. For example, if the casing diameter decreases, the holdback or drag force increases as the narrowed section of casing passes over the fixed circumference of the sizing disc. The increased drag slows the passage of casing so its stuffed diameter increases. Conversely, if the casing diameter increases, the casing passes more freely over the disc so the stuffed diameter decreases. The result is a stuffed product having a substantially constant diameter.

U.S. Pat. No. 4,077,090 discloses an improvement to the system of U.S. Pat. No. Re. 30,390 by providing means to adjust the drag at the onset of stuffing. In the '090 Patent, a pressure ring is positioned adjacent the sizing disc which directs the casing through a tortuous path first over the sizing disc and then inward through the pressure ring. By adjusting and then fixing the longitudinal distance between the pressure ring and the sizing disc, the drag on the casing is adjusted. However, once made, the adjustment is fixed and is not altered unless stuffing is stopped. Also, the system must be manually set. This is done by manually measuring the circumference of the first several stuffed pieces or "logs". The operator then makes a manual adjustment to increase or decrease holdback as needed to provide the correct stuffed diameter.

Periodically during stuffing, the operator will measure the circumference of a log and will stop the machine to make any adjustment needed to correct for deviations from the desired circumference. Accordingly, while the machine is designed for continuous stuffing, the start-up procedure and any subsequent stuffed diameter correction require stopping the machine. This detracts from the economic benefits of continuous operation. Stopping the machine also allows sections of deshirred casing to lose moisture during the interval that the machine is stopped and these sections may have different stuffing properties than casing sections of higher moisture.

Various systems are known for automatically adjusting the drag on the casing during the stuffing cycle to reduce the need for stopping the stuffing operation. For example, U.S. Pat. Nos. 3,553,768 and 4,558,488 disclose use of pneumatic means to monitor the diameter of a filled casing and to adjust the drag on the casing during stuffing. Other patents, such as U.S. Pat. Nos. 2,999,270, 3,148,408 and 3,396,426, disclose use of electrical or mechanical means in combination with pneumatic means for controlling such characteristics as the weight and diameter of a stuffed casing.

OBJECTS OF THE INVENTION

One object of the present invention is to provide an apparatus and method for controlling the filled diameter of the casing as it is being stuffed.

Another object of the invention is to provide an electro-mechanical system which changes the drag on the casing in direct response to changes in the filled diameter so as to produce a stuffed product having a substantially uniform diameter over its length.

Yet another object of the invention is to provide an electro-mechanical system which automatically controls and adjusts the drag on the casing during the stuffing of shirred casing so as to produce a plurality of stuffed products, each having substantially the same uniform diameter.

Still another object of the invention is to provide an electro-mechanical system to monitor and control stuffed diameter of shirred casing which includes a time delay so information from monitoring the diameter of one stuffed product is utilized to adjust the drag on the casing for stuffing the next product.

SUMMARY OF THE INVENTION

One embodiment of the present invention is characterized by a stuffing apparatus having means for automatically maintaining the diameter of the stuffed product at a preselected diameter comprising:

(a) means for extruding a food product along a stuffing axis and into a casing drawn in a forward direction from a shirred stick disposed about said stuffing axis for stuffing the casing;

(b) adjustable drag means arranged to contact and press against a casing being drawn forwardly from a said shirred stick, said drag means being adjustable for increasing or decreasing the drag on the casing to alter the stuffed diameter of the casing;

(c) sensing means for monitoring the stuffed diameter of the casing and generating an electric control signal representing changes in the stuffed diameter from said preselected value including at least two diameterically opposed shoes supported for independent movement in a plane transverse said stuffing axis, and bias means urging said shoes toward said stuffing axis and against the surface of a stuffed product passing between said shoes; and (d) an electric motor operatively connected to said adjustable drag means and driven responsive to said control signal for adjusting the drag on the casing being drawn forward from a said shirred stick.

In a method embodiment, the present invention is characterized by a method for automatically maintaining the diameter of a stuffed product at substantially a preselected diameter along its length comprising the steps of:

(a) passing casing to be filled along a stuffing axis while contacting the casing with a drag means which is adjustable to increase or decrease the drag on the casing;

(b) introducing a food product into the casing;

(c) monitoring the stuffed diameter of the casing by contacting sensing members against diametrically opposite sides of the stuffed casing and generating an electric control signal representing deviations of the stuffed diameter from the preselected diameter;

(d) communicating said electric control signal to an electric motor operatively connected to said drag means; nd (e) increasing or decreasing the drag on the casing as needed to maintain substantially said preselected diameter by adjusting said members drag means by the operation of said motor responding to said electric control signal.

DETAILED DESCRIPTION OF THE INVENTION

Figure 1:
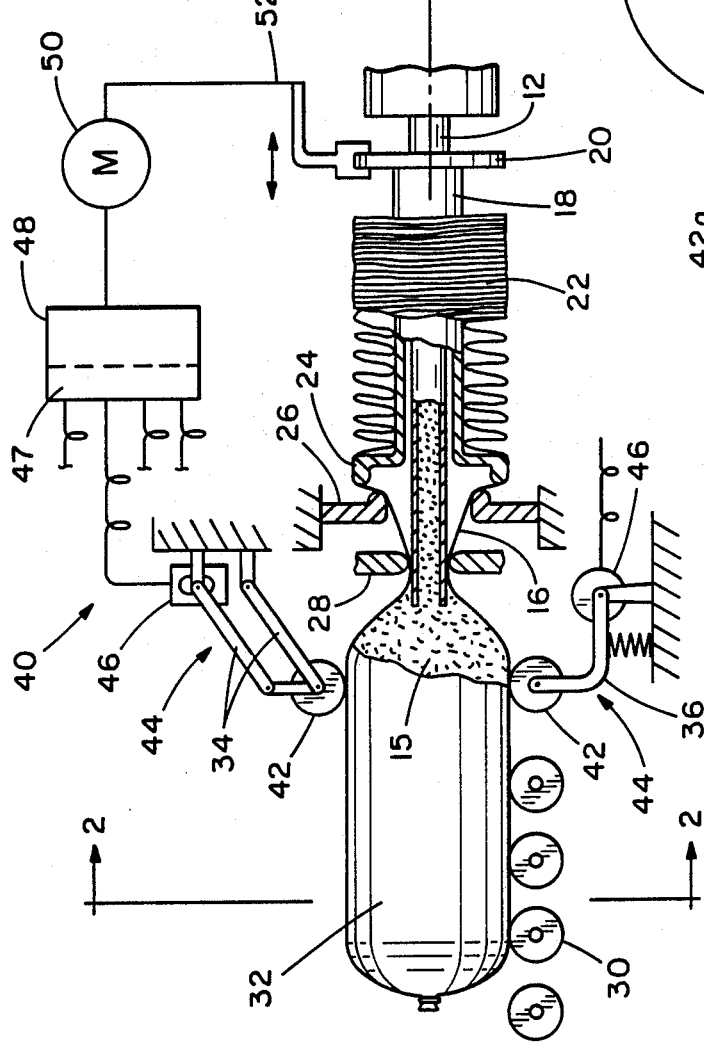
FIG. 1 is a schematic representation in side elevation showing the automatic size control system of the present invention.

Referring to the drawings, FIG. 1 shows a stuffing machine of the type generally described in U.S. Pat. No. Re. 30,390. The machine has a stuffing horn 12 disposed along a stuffing axis 14 for extruding a food product 15 into a casing 16 drawn in a forward direction along the stuffing axis. Slidably disposed about the horn is a sleeve 18. The aft end of the sleeve includes a flange 20 for connection to the machine as set out further hereinbelow.

Carried by the sleeve 18 is a supply of shirred casing 22. Also carried by the sleeve, at its fore end, is a sizing disc 24. The function of the sizing disc 24 is well known in the art. Briefly, it is used to open and unwrinkle the casing 16 which deshirrs from the shirred casing 22 and/or to circumferentially stretch the casing prior to stuffing. The disc can be detachable from the sleeve in order to replace casing. It is preferred, however, to provide the sleeve 18, shirred casing 22 and sizing disc 24 as a unitary shirred casing article. Such an article is disclosed, for example, in U.S. Pat. No. 4,570,292.

The casing which deshirrs over the sizing disc 24 passes through a pressure ring 26. The pressure ring is part of the stuffing machine and generally it is fixed at some preset position during stuffing. The sleeve 18 (and therefore the disc 24 attached to the sleeve) is movable towards and away from the pressure ring. As mentioned above, this movement is utilized to increase or decrease the drag or holdback on the casing as needed to increase or decrease the stuffed diameter of the casing. In this respect, moving the disc 24 towards the pressure ring 26 will increase the drag and the stuffed diameter, whereas, moving the disc away from the pressure ring will decrease the drag and the stuffed diameter. This action is more fully described in U.S. Pat. Nos. 4,077,090 and 4,164,057.

Also conventional is a seal ring 28 which prevents the food product from back flowing around the discharge end of the stuffing horn and a conveyor 30 for supporting the stuffed piece or "log" 32 and conveying it away from the stuffing horn. Not shown is a conventional clipper carriage for gathering, closing and severing the casing after a desired length of casing is stuffed.

The system providing for automatic size control is generally indicated at 40. The system includes a member 42 for contacting against the stuffed log 32. Contacting member 42 can be any suitable means such as a roller, as shown, or a non-rotating member. For purposes of this description, the contacting member 42 will be referred to hereafter as a "shoe".

The system 40 also includes a floating structure, generally indicated at 44 for supporting shoe 42, an encoder 46 associated with the shoe, a microcomputer 48, a stepping motor 50 and means 52 for connecting the stepping motor to sleeve flange 20.

As shown in FIG. 1, there preferably are at least two shoes 42 in the system positioned at diametrically opposite sides of the product. It also is preferred that the floating structure 44 be a parallel motion linkage as shown at 34 although a lever arm as shown at 36 may also be used.

Figure 5:
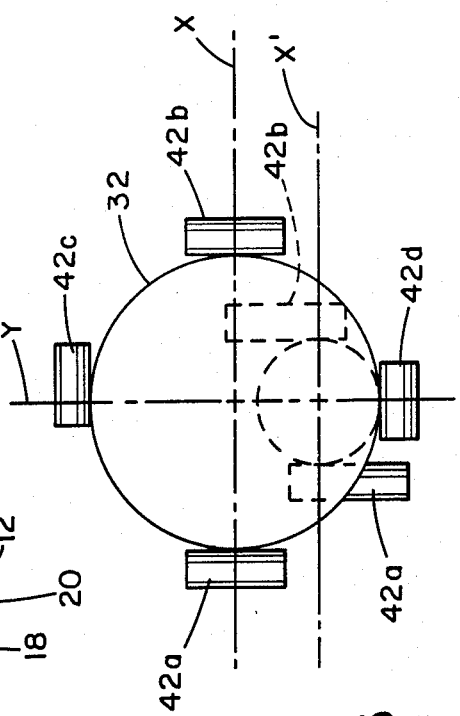
FIG. 5 is a head-on schematic view showing the relative position of sensing means for two different diameter logs.

A parallel motion linkage 34 is preferred because it will maintain two diametrically opposite shoes 42 parallel and in the same transverse plane as the shoes move responsive to changes in stuffed diameter. FIG. 5 shows in solid line, two diametrically opposite shoes 42a, 42b riding against the surface of a stuffed log 32 for measuring its diameter along an "X" axis of the log cross section. To measure the log diameter, the shoes must be perpendicular to the radius of the stuffed product at the point of contact. To accomplish this the shoes are arranged so they remain perpendicular to a plane containing the stuffing axis. For a log of a different diameter, as shown in dotted line, the shoes 42a, 42b will remain parallel for measuring the log diameter along the X' axis, even though there may be some misalignment of the shoes in the "Y" axis.

While a log is assumed to be perfectly round (so only two diametrically opposed shoes 42a, 42b are needed) this may not always be the case. Accordingly, three, four or more shoes are useful for approximating the circumference of an out-of-round log.

Figure 2:
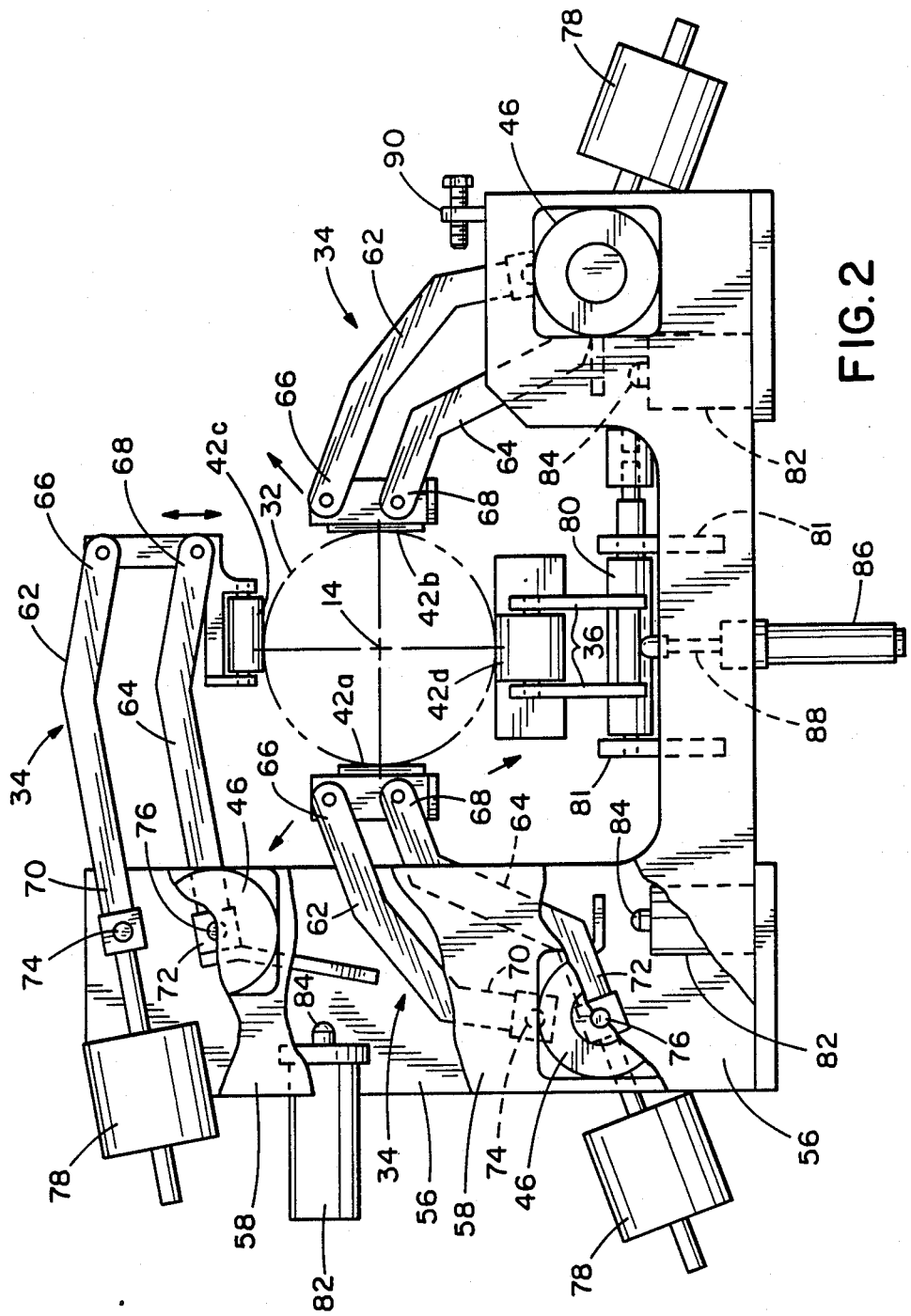
FIG. 2 is a view taken along lines 2—2 of FIG. 1 showing selected components of the size control system and with other components, not essential to an understanding of the system, being omitted for clarity.

FIG. 2 shows an arrangement of four shoes 42. One shoe 42c is at the top. Shoes 42a, 42b are at each side of the stuffed product and shoe 42d or shoes 42c, 42d is at the bottom of the stuffed product. The top and side shoes are each supported by a parallel motion linkage 34 whereas the bottom shoe (FIGS. 1 and 2) is carried on one end of a lever arm 36 which is biased so it urges the shoe against the bottom of the stuffed product. Associated with each shoe is a digital encoder 46.

Figure 4:
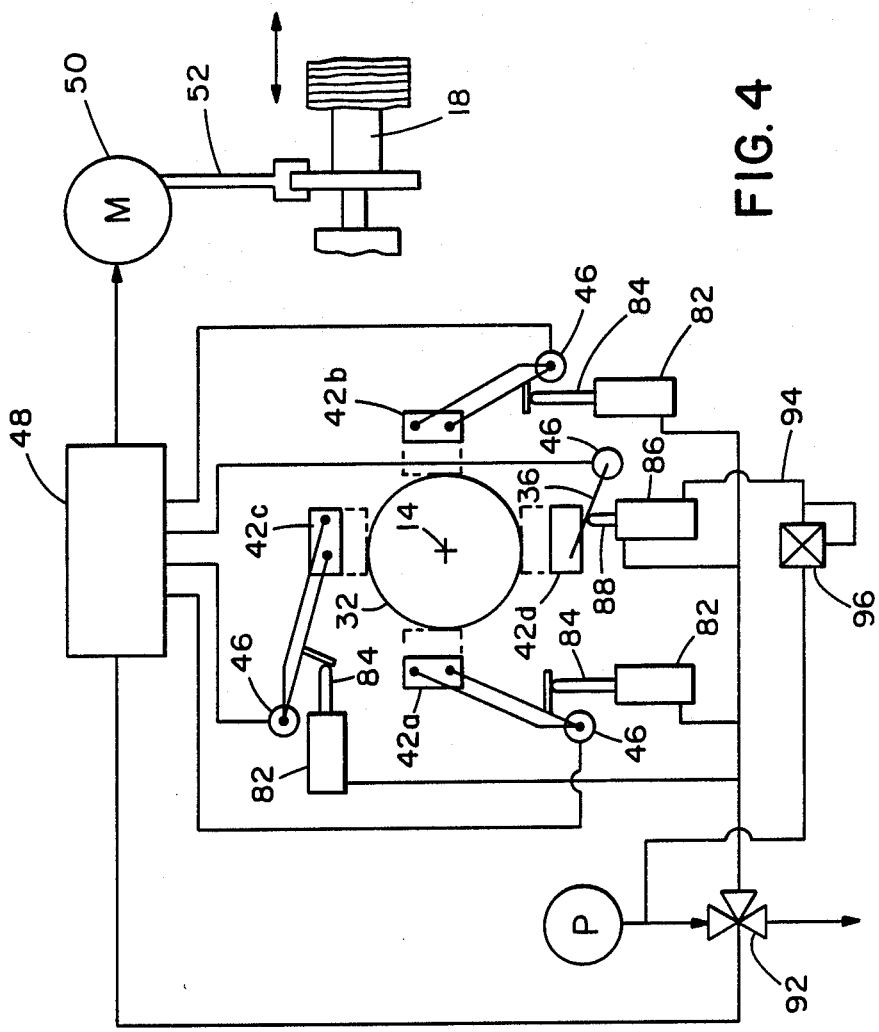
FIG. 4 is a schematic diagram showing the inter relationship of the various components of the automatic control system of the present invention.

Movement of each shoe 42 is translated to a stream of electrical pulses by the encoders 46, wherein the number of pulses represent the deviation of the shoes from some preset position. The stream of pulses from each encoder is fed to microcomputer 48 (FIGS. 1 and 4). If the data from the encoders indicate the stuffed diameter is deviating from a desired diameter, the microcomputer issues an electrical control signal which operates an electric motor, as for example a stepping motor 50, to make corrections in the drag on the casing.

The stepping motor, driven by electric signals from the microcomputer, operates through connection 52 to move the sleeve 18 longitudinally in defined increments towards or away from the pressure ring 26 thereby increasing or decreasing, respectively, the drag on the casing (FIG. 1).

In one embodiment of the invention, microcomputer 48 issues electrical control signals responsive to instantaneous information from encoders 46. In this fashion the drag on the casing is adjusted as the log 32 is being stuffed so as to provide the stuffed product with a substantially constant diameter over its length.

An instantaneous response also can be used to make logs which are tapered from end to end wherein the log diameter gradually changes from a given diameter at one end to a larger (or smaller) diameter at its other end. A tapered log would be useful where the logs are hung vertically for processing. If the log is tapered in a controlled fashion, it can be hung for processing with the smaller end down to compensate for an increase in the diameter of the lower end due to the effects of gravity on the food product. The present invention can provide tapered logs by programming the microcomputer to provide a constant deviation of the stuffed diameter from one end of the log to the other. The control signal generated by the microcomputer will operate to continuously change the drag as needed to provide the desired tapered profile.

In another embodiment of the invention, the microcomputer includes a memory portion 47 which stores encoder data taken at intervals along the length of a first log. The microcomputer then averages this data and makes an appropriate corrective movement of sleeve 18 prior to starting the stuffing of a next log. In this case, each log becomes the reference for effecting a correction to the next log to be stuffed. In this embodiment shoes 42 can be located to measure each "reference" log as it is being stuffed (as shown in FIG. 2) or they can be located to measure the log after the casing has been gathered and closed.

Figure 3:
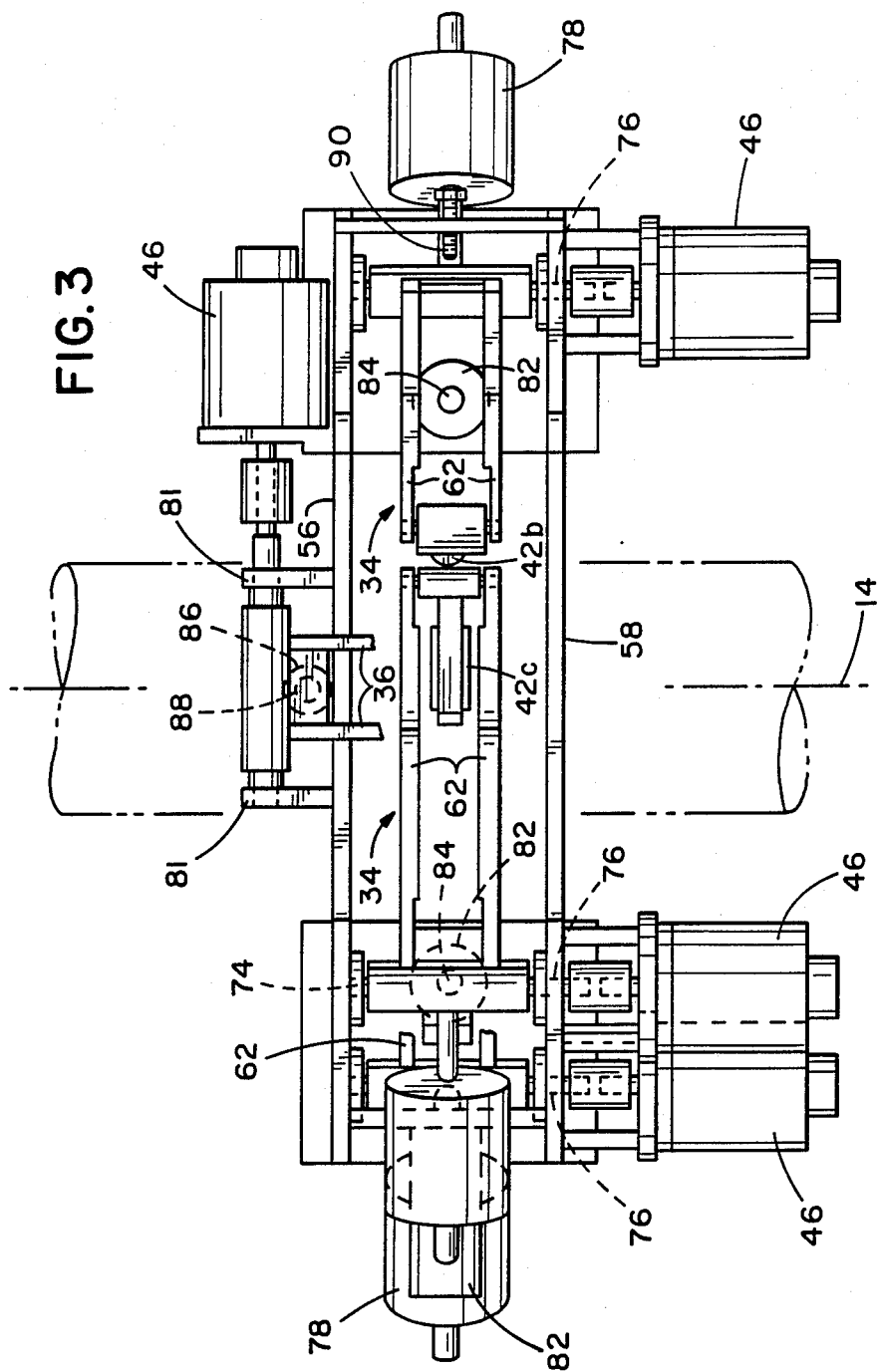
FIG. 3 is a top view of FIG. 2.

As best seen in FIGS. 2 and 3, the three parallel motion linkages 34 and the lever arm 36 are carried by a frame composed of two parallel plates 56, 58. The plates are disposed transverse the stuffing axis 14 so that movement of the parallel motion linkages 34 occurs in a vertical plane transverse to the stuffing axis. The three parallel motion linkages 34 are substantially the same, although the configuration of corresponding components may differ due to its location (i.e., top, right side or left side as viewed in FIG. 2).

Each parallel motion linkage 34 is composed of two upper arms 62 and two lower arms 64. Each arm is pivoted at one end 66, 68 to shoe 42. The other end 70, 72 of each arm is fixed to a rod 74, 76 which extends between and is journaled to plates 56, 58.

The center of gravity of each parallel motion linkage 34 is such that it will fall inward towards stuffing axis 14 so the shoes 42a-c carried by these linkages will contact the stuffed log 32 (shown in phantom line). An adjustable counter balance 78 is provided for each parallel motion linkage 34 for adjusting the centers of gravity so there is a quick response to any increase or decrease in the diameter of the stuffed log. The counter balances also offset and minimize the bearing force of the shoes against the log to minimize the penetration of the shoes into the cross-section of the logs.

The bottom shoe 42d (FIG. 2) has a support which is slightly different from the support of the top and side shoes 42a-c. In this respect, shoe 42d is supported between two lever arms 36. These lever arms are fixed to a rod 80 which extends between, and is journaled to, brackets 81 on plate 56. As discussed further hereinbelow, the lever arms 36 are urged upward so the bottom shoe 42d will remain in contact with the bottom of the stuffed log 32. With this arrangement, the top and bottom shoes 42c, 42d are in a position to measure the diameter of the stuffed log 32 along its "Y" axis (see FIG. 5).

The digital encoders 46 associated with each shoe 42 are operatively connected to the rods 76, 80 so that rotation of these rods will result in the encoders producing an output signal. The digital encoders are conventional and will translate the rotation of bars 76, 80 to a stream of electrical pulses wherein the number of pulses represents the arc length through which the bar rotates. In this fashion, inward or outward movement of each shoe 42 is converted to a stream of electrical pulses, representing the magnitude of shoe movement.

There are times during the operating cycle when it is necessary to restrain the parallel motion linkages from moving by gravity. For example, when a fresh casing article is loaded onto the stuffing horn 12, the shoes 42 should be displaced radially away from the stuffing axis to a retracted position to facilitate access to the stuffing horn.

Retraction from the stuffing axis also is preferred during intervals of the stuffing cycle when there is no stuffed product 32 between the shoes 42. This occurs in the interval between the time the trailing end of a stuffed log is closed, severed and moved down the conveyor, and the time the leading end of the next stuffed log enters between the shoes. The seal ring 28 and pressure ring 26 (FIG. 1) also are displaceable from the horn 12 to permit loading of a casing article. However, the manner of the displacement of the rings 26, 28 forms no part of the present invention and reference is made to U.S. Pat. No. Re. 30,390 for a disclosure of how this may be accomplished.

To accomplish the retraction of shoes 42a-c, FIGS. 2 and 4 show that a pneumatic cylinder 82 is associated with each of the parallel motion linkages 34. The cylinders are arranged so that when they are pressurized the stem 84 in each cylinder extends and pushes against the parallel motion linkages to retract them from the stuffing axis. After a time interval sufficient to permit the leading end of a stuffed product to enter between the shoes 42, the cylinders are vented to release the parallel motion linkages and allow the sensors to fall inward and against the stuffed product.

Since bottom shoe 42d is disposed beneath the stuffed product, gravity will move it away from the stuffing axis. Consequently, the pneumatic cylinder 86 associated with the bottom shoe is maintained under a slight positive pressure so its stem 88 pushes on the lever arm 36 to bias the bottom shoe against the stuffed product. To retract the bottom shoe 42d, the cylinder 86 is pressurized so as to move the stem 88 away from the lever arm.

As an alternative to a time delay for releasing the parallel motion linkages 34, the bottom shoe 42d can be utilized as a limit switch to indicate the presence of a log between the shoes. For example, the slight positive pressure on cylinder 86 will urge the bottom shoe 42d into the path of a log. When stuffing starts the leading end of the log passes over and displaces the bottom shoe. This displacement can be utilized to trigger venting of pneumatic cylinders 82 so the parallel motion linkages 34 can swing towards the log.

Associated with each parallel motion linkage 34 and with lever arm 36 is an adjustable stop 90 (only one of which is shown in FIG. 2). These stops define a fully retracted position for each of the sensors and are used to calibrate the encoders. To calibrate the encoders 46 a calibration disc (not shown) of known diameter is put into a position between sensors to simulate a stuffed log. The shoes 42 are each brought into contact the disc. The parallel motion linkages 34 and pivot arm 36 are then retracted until they contact the stops 90. The number of pulses issued by each encoder during this movement is noted and becomes the reference "zero" point for the encoders.

In operation, the encoders 46 will provide data, in the form of pulses, to the microcomputer 48 to indicate the deviation of the position of the shoes from the preset "zero" reference point of each encoder. With a minimum of two inputs, (i.e., data from any two diametrically opposite shoes) the microcomputer 48 is able to determine the diameter of the stuffed product.

The operation of the automatic size control system will be described as beginning at the start of a stuffing cycle. At this point the system has been calibrated, as set out above. Also, at this point, the shirred casing 22 is on the stuffing horn and the leading end of the casing (disposed forward of the stuffing horn) is closed by a clip or other means not shown. The pressure ring 26 and seal ring 28 are in position as shown in FIG. 1, and the shoes 42 are all in a retracted position.

To hold the shoes 42 in a retracted position and away from the stuffing axis, as shown in solid line in FIG. 4, each cylinder 82 is pressurized so as to extend its stem 84 and cylinder 86 is pressurized so as to retract its stem 88. With the shoes all retracted, stuffing is started. After a time delay, or after a positive signal from a limit switch (not shown) indicating that the leading end of the stuffed casing has entered between the shoes 42, an air valve 92 is operated to vent each of the cylinders 82. This allows each of the shoes 42a-c to fall towards the stuffing axis 14 and against the surface of the stuffed casing 32 as shown in dotted line FIG. 4. However, venting the bottom cylinder 86 causes its stem 88 to extend responsive to the positive pressure maintained in the cylinder through the air line 94 and pressure reducer 96. This causes the bottom shoe 42d to move against the surface of the stuffed casing.

The shoes 42 now can float against the surface of the stuffed casing as the log passes by the shoes. Radial movement of the shoes, responsive to changes in stuffed diameter, causes each encoder 46 to issue a stream of electrical pulses representing the deviation from the preset "zero" position. These pulses are fed to the microcomputer 48 which then generates a control signal to drive stepping motor 50. As mentioned hereinabove, the stepping motor 50 moves the sleeve 18 (FIG. 1) in increments responsive to this control signal for changing the drag on the casing and, thereby, changing the stuffed diameter.

In one embodiment the response of the microcomputer 48 can be instantaneous so that corrections in casing drag and stuffed diameter can be made while stuffing. This embodiment can be used either to make logs of substantially constant diameter or to make tapered logs.

In another embodiment the encoder information is stored until the entire log is stuffed so the microporcessor can issue one control signal to the stepping motor to correct for the average deviation of stuffed diameter over the entire length of the log. In this fashion, each stuffed log becomes the reference for making corrections to the holdback applied to the casing for stuffing the next following log.

Each "reference" log can be measured either while stuffing or after the desired length of log has been stuffed and a clipper mechanism, (not shown) has gathered, closed, and severed the casing at the trailing end of the log.

After stuffing the pneumatic cylinders 82 are all pressurized so as to cause a retraction of shoes 42 back to the solid line position shown in FIG. 4. This position is held until the leading end of the next log has entered between the shoes 42.

To demonstrate the invention, a stuffing machine of Viskase Corporation identified as the SHIRMATIC 600 Sizer was modified to incorporate the automatic size control system as described herein. In particular, four shoes 42 were employed as shown in FIGS. 2 and 3 to measure the diameter of the log during stuffing. The four digital encoders used in the system were Bei Motion Systems Co. type H25D and the stepping motor was a type 34D-9209A made by Rapidsyn Div. of American Precision Co. The operative connection of this motor to the sleeve 18 provided for a total travel of two (2) inches at a rate of 14,400 steps per inch.

A Micro-Aide Corporation Z-80 microcomputer with a programmable memory was utilized to process the data from each of the encoders and to issue a control signal to the stepping motor. Using high level Basic as the program language, the microcomputer program counted the pulses from each encoder at each of several locations along the length of the stuffed product. The program then processed the count to compute the actual average diameter of the stuffed product and compared the actual average diameter to the desired nominal diameter. If these values differed, the program computed the magnitude of a control signal needed to make an appropriate correction in the drag on the casing for stuffing the next product. The control signal issued by the microcomputer is a stream of pulses wherein each pulse will drive the stepping motor one step.

A stuffing test was conducted utilizing equipment as described hereinabove for stuffing a balogna-type meat emulsion into a Viskase size 7½ fibrous casing. The target nominal stuffed diameter was 4.62 inches ±0.005 inch. At the start of stuffing, the sizing disc 24 and pressure ring 26 of the stuffing apparatus were purposely set to understuff the casing. Twelve logs, each 48 inches long, were stuffed in sequence and without any further manual adjustment of the distance between the sizing disc and pressure ring.

In order to test the ability of the automatic size controller to correct for unexpected changes in stuffing conditions, the speed of the stuffing machine emulsion pump was increased prior to stuffing the sixth log, and it was kept at this speed for stuffing logs six through twelve. Increasing the pump speed has the effect of decreasing the stuffed diameter of the log.

The diameter of each log was manually measured immediately after stuffing at intervals along its length using a conventional "pi" tape in order to obtain an average diameter for each log.

The automatic size controller was then rendered inoperative for a second stuffing test. The second test used the same size casing, the same emulsion and the same initial pump speed as the first test. The sizing disc 24 and pressure ring 26 were also set, as before, to understuff the casing.

With this arrangement, a first log was stuffed and the stuffing operation halted while a manual measurement of the log was made. As expected, the first log was undersized so the operator made a manual adjustment to the sizing disc/pressure ring distance and a second log was stuffed. The operation was again halted and the log measured. The second log was slightly over target but it was close enough to commence automatic stuffing. After three more logs were stuffed, the speed of the emulsion pump was suddenly increased (as in the first test) and an additional seven logs were stuffed. The diameter of all logs were measured immediately after stuffing to obtain an average diameter for each log.

Figure 6:
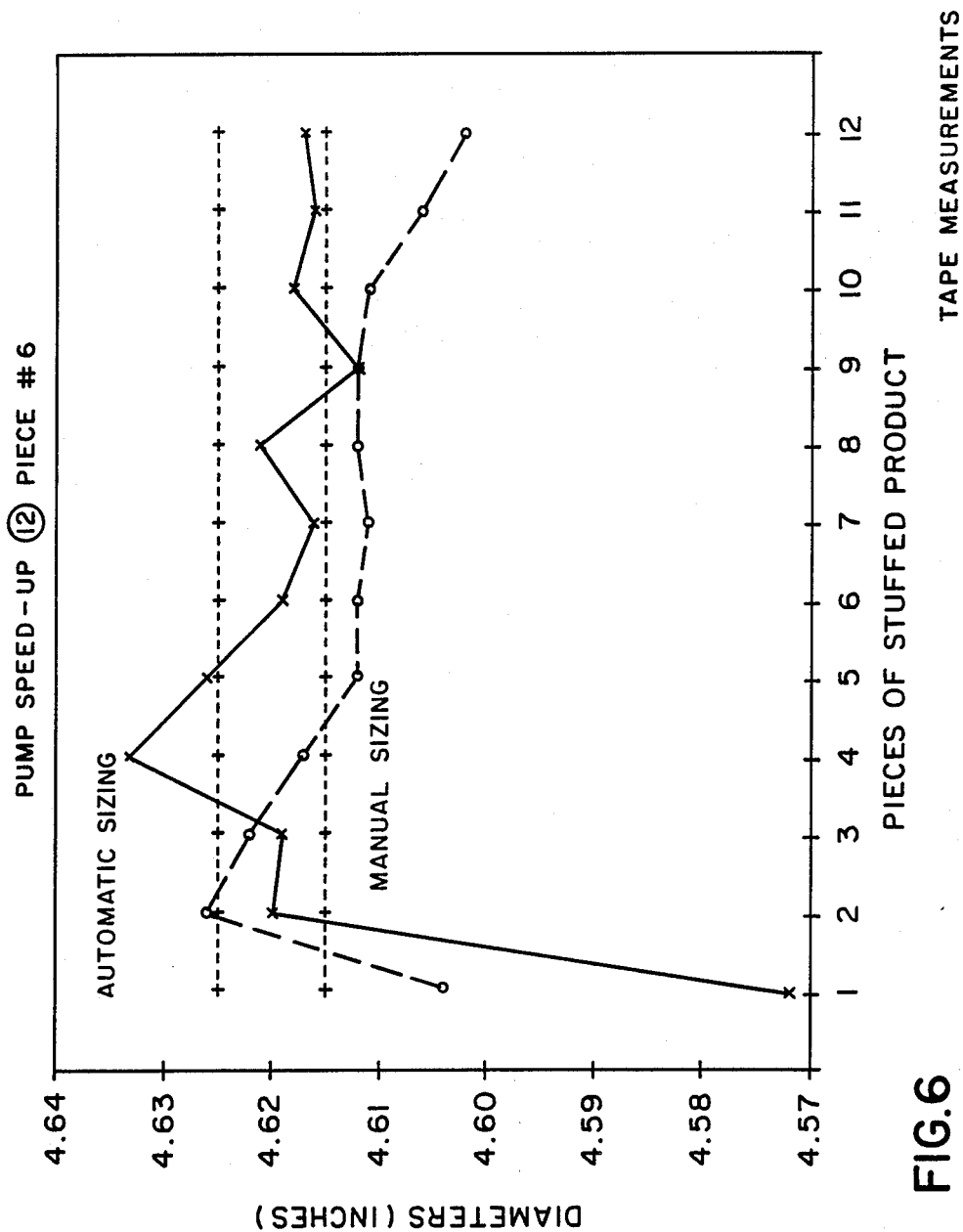
FIG. 6 is a graph showing the stuffed diameter of logs produced during continuous stuffing using both a conventional manual size control and the automatic size control of the present invention.

FIG. 6 is a graph showing a comparision of the results of both tests. In the test using the automatic size controller of the present invention, the diameter of the first log was below target (i.e., understuffed) as expected. The size controller made an automatic correction so the diameter of the second log was substantially at the target diameter. For some unknown reason, the fourth log was oversize. The automatic size controller made an adjustment which brought the diameter of the fifth log within tolerance. As expected, the increase in pump speed resulted in a smaller stuffed diameter for the sixth log. However, no size adjustment was needed until the ninth log was stuffed. The ninth log was below tolerance so the size controller made an automatic correction which brought the stuffed diameter of the tenth log within tolerence.

In contrast, without automatic size control, manual adjustment required stopping the stuffing operation twice for measurements and manual adjustments. Thereafter, during continuous operation, no corrections were made and the stuffed diameter fell and remained below tolerance.

Thus, it should be appreciated that the present invention accomplishes its intended objects in providing an electro-mechanical system for automatically adjusting the filled diameter of the casing. The use of shoes 42 that float against the filled casing and digital encoders 46 that issue an electric signal representing changes in diameter sensed by the shoes, provide means for continuously monitoring stuffed diameter. The use of a microcomputer permits either an instantaneous use of the encoder data for effecting corrections in the stuffed diameter or a storage and averaging of the data for use in effecting a correction to the stuffed diameter of the next log to be stuffed. Use of the stepping motor and the sizing disc/pressure ring arrangement permits defined incremental changes to be made in the longitudinal spacing between the sizing disc and pressure ring for controlling the drag on "holdback" on the casing.

While the present invention has been described with reference to an adjustable casing holdback means comprising a fixed pressure ring and longitudinally movable sizing disc, other adjustable holdback means may be employed such as a longitudinally movable pressure ring and fixed sizing disc (U.S. Pat. Nos. 4,649,602 and 4,430,773), a drag means tiltable with respect to the stuffing axis (U.S. Pat. No. 4,467,499) or a drag means having components movable radially with respect to the stuffing axis (U.S. Pat. Nos. 4,521,938 and 4,430,772).

Having thus described the invention in detail, what is claimed as new is:

1. A stuffing apparatus having means for automatically maintaining the diameter of a stuffed product at a preselected diameter comprising:
   (a) means for extruding a food product along a stuffing axis and into a casing drawn in a forward direction from a shirred stick disposed about said stuffing axis for stuffing the casing;
   (b) adjustable casing drag means arranged to contact and press against a casing being drawn forwardly from a said shirred stick, said drag means being adjustable for increasing or decreasing the drag on the casing to alter the stuffed diameter of the casing;
   (c sensing means for monitoring the stuffed diameter of the casing including at least two diametrically opposed shoes supported for independent movement in a plane transverse said stuffing axis and bias means for urging said shoes towards said stuffing axis and against the surface of a stuffed product passing between said shoes;
   (d) means operatively connected to said shoes for generating an electric control signal representing changes in the stuffed diameter from said preselected value; and
   (e) an electric motor operatively connected to said adjustable drag means and driven responsive to said control signal for adjusting the drag on the casing being drawn forward from a said shirred stick.

2. A stuffing apparatus as in claim 1 wherein said means for genenrrating said control signal comprises:
   (a) a digital encoder operatively connected to each of said shoes for producing data in the form of electric pulses representing the movement of each said shoes from a predetermined position; and
   (b) a microcomputer for receiving said pulses and issuing said control signal to drive said electric motor.

3. A stuffing apparatus as in claim 2 wherein said motor is a stepping motor.

4. A stuffing apparatus as in claim 2 wherein said microcomputer includes a memory section for storing data from said encoders taken at intervals over the stuffed length of a stuffed product and said microcomputer being adapted to utilize said stored data to generate said control signal representing the average deviation of the stuffed diameter over the length of the stuffed product.

5. A stuffing apparatus as in claim 1 including means for supporting said shoes comprising parallel motion linkage arranged for movement in a vertical plane substantially transverse said stuffing axis.

6. A stuffing apparatus as in claim 1 wherein said diametrically opposed shoes are parallel and including means for supporting said shoes comprising.
   (a) a frame disposed transverse said stuffing axis;
   (b) a parallel motion linkage pivoted to said frame for movement in a vertical plane transverse said stuffing axis; and
   (c) at least one of said shoes being mounted to said parallel motion linkage and oriented thereon so that said at least one shoe remains substantially perpendicular to a plane containing said stuffing axis whereby said shoe is perpendicular to the radius of the stuffed product at the point of contact of said shoe with the product.

7. A stuffing apparatus as in claim 6 having at least two of said parallel motion linkages mounted to said frame, each carring one of said shoes for contacting against diametrically opposite sides of the stuffed product.

8. A stuffing apparatus as in claims 1, 6, 7 or 8 wherein said bias means is provided by supporting said shoes such that gravity urges them towards said stuffing axis.

9. A stuffing apparatus as in claim 6 or 8 wherein
   (a) said parallel motion linkage is mounted to said frame such that its center of gravity is positioned to cause said linkage to move towards said stuffing axis; and
   (b) an adjustable counter weight on said parallel motion linkage for adjusting the center of gravity of said parallel motion linkage.

10. A stuffing apparatus as in claim 1 including drive means for moving each of said shoes against said bias means and away from said stuffing axis, said drive means comprising:
    (a) a pneumatic cylinder associated with each of said shoes for moving said shoes in a direction away from said stuffing axis; and
    (b) means for operating said pneumatic cylinders when a stuffed product is not between said shoes.

11. A stuffing apparatus having means for automatically maintaining the diameter of a stuffed product at a preselected diameter comprising:
    (a) means for extruding a food product along a stuffing axis and into a casing drawn in a forward direction from a shirred stick disposed about said stuffing axis for stuffing the casing;
    (b) adjustable casing drag means including cooperating members disposed about said stuffing axis and arranged to contact and press against a casing being drawn forwardly from a said shirred stick and between said members, at least one of said members being moveable with respect to the other of said member to increase or decrease the drag on the casing and thereby to alter the stuffed diameter of the casing;
    (c) sensing means for monitoring the stuffed diameter of the casing and generating an electric control signal representing changes in the stuffed diamter from said preselected value; and
    (d) an electric motor operatively connected to said at least one movable member and driven responsive to said control signal for adjusting the drag on the casing being drawn forward from a said shirred stick.

12. A stuffing apparatus as in claim 11 wherein one of said cooperating members is fixed with respect to said stuffing axis and said movable member is longitudinally adjustable with respect to said stuffing axis towards and away from said fixed member.

13. A method for automatically maintaining the diameter of a stuffed product at substantially a preselected diameter along its length comprising the steps of:
    (a) passing casing to be filled along a stuffing axis while contacting the casing with a drag means which is adjustable to increase or decrease the drag on the casing;
    (b) introducing a food product into the casing;
    (c) monitoring the stuffed diameter of the casing by contacting sensing members against diametrically opposite sides of the stuffed casing and utilizing the contacting sensing members for generating an electric control signal representing deviations of the stuffed diameter from the preselected diameter;
    (d) communicating said electric control signal to an electric motor operatively connected to said drag means; and
    (e) increasing or decreasing the drag on the casing as needed to maintain substantially said preselected diameter by adjusting said drag means by the operation of said motor responding to said electric control signal.

14. A method as in claim 13 wherein monitoring the stuffed diameter comprises;
    (a) generating electric pulses representing the distance moved by the sensing members from a predetermined position as the stuffed casing moves past the sensing members; and
    (b) utilizing said pulses for generating said electric control signal.

15. A method as in claim 14 including:
    (a) storing said electric pulses generated by monitoring the stuffed diameter of casing during the stuffing of a first product; and
    (b) utilizing said stored electric pulses for adjusting the drag on the casing prior to the filling of a second product by generating an electric control signal from said stored electric pulses and communicating said electric control signal to said electric motor.

16. A method as in claim 14 including the step of moving the sensing members away from the stuffing axis during the period when there is no stuffed casing between the sensors.

17. A method as in claim 16 where said moving step is accomplished by pneumatically urging the sensors away from the stuffing axis.

18. A method as in claim 13 wherein adjusting the drag on said casing is done continuously to produce a log having a tapered profile.

* * * * *